(12) United States Patent
Kondo et al.

(10) Patent No.: US 11,454,295 B2
(45) Date of Patent: Sep. 27, 2022

(54) ANTI-VIBRATION APPARATUS HAVING BRACKET

(71) Applicant: Sumitomo Riko Company Limited, Aichi (JP)

(72) Inventors: Hiroki Kondo, Aichi (JP); Kenji Oki, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 78 days.

(21) Appl. No.: 17/089,735

(22) Filed: Nov. 5, 2020

(65) Prior Publication Data

US 2021/0048086 A1 Feb. 18, 2021

Related U.S. Application Data

(63) Continuation of application No. PCT/JP2020/005057, filed on Feb. 10, 2020.

(30) Foreign Application Priority Data

Mar. 26, 2019 (JP) .............................. JP2019-058918

(51) Int. Cl.
 *F16F 15/08* (2006.01)
 *B60K 5/12* (2006.01)

(52) U.S. Cl.
 CPC ............ *F16F 15/08* (2013.01); *B60K 5/1208* (2013.01); *F16F 2230/0041* (2013.01)

(58) Field of Classification Search
 CPC .......... F16F 15/08; F16F 13/103; F16F 13/10; F16F 1/36; F16F 2226/04;
 (Continued)

(56) References Cited

U.S. PATENT DOCUMENTS 9,593,732 B2    3/2017  Thierry et al.
9,739,333 B2 *  8/2017  Michiyama .......... B60K 5/1208
(Continued)

FOREIGN PATENT DOCUMENTS

EP    1628040    10/2007
JP    4113889    7/2008
(Continued)

OTHER PUBLICATIONS

"Written Opinion of the International Searching Authority (Form PCT/ISA/237) of PCT/JP2020/005057," dated Apr. 14, 2020, with English translation thereof, pp. 1-8.
(Continued)

*Primary Examiner* — Pamela Rodriguez
(74) *Attorney, Agent, or Firm* — JCIPRNET

(57) ABSTRACT

In an anti-vibration apparatus having a bracket where an anti-vibration apparatus body in which a first mounting member and the second mounting member are connected by a body rubber elastic body is horizontally mounted to the bracket by fitting parts disposed on two sides of a width direction of the second mounting member in the anti-vibration apparatus body to fitting grooves disposed on opposite inner surfaces on two sides of a width direction of the bracket, a locking hole is provided on a deep wall part located on a deep side in a mounting direction of the second mounting member in the bracket, and a locking part is disposed at a tip portion in the mounting direction of the second mounting member to the bracket, and prevents return in a direction opposite to the mounting direction by inserting and locking the locking part to the locking hole.

2 Claims, 4 Drawing Sheets

(58) Field of Classification Search
CPC ......... F16F 2230/0005; F16F 2224/025; F16F 2230/0041; B60K 5/1208
See application file for complete search history.

(56) References Cited

U.S. PATENT DOCUMENTS

| | | | |
|---|---|---|---|
| 9,931,923 B2 | 4/2018 | Oki et al. | |
| 10,906,384 B2* | 2/2021 | Kadowaki | F16F 1/3849 |
| 2010/0264570 A1* | 10/2010 | Thierry | F16F 13/103 |
| | | | 267/141 |
| 2015/0252866 A1* | 9/2015 | Muraoka | F16F 13/085 |
| | | | 267/140.13 |
| 2016/0238102 A1* | 8/2016 | Goto | F16F 13/103 |
| 2017/0122398 A1 | 5/2017 | Michiyama et al. | |
| 2017/0335920 A1* | 11/2017 | Kanaya | B60K 5/1208 |
| 2017/0341500 A1* | 11/2017 | Oki | B60K 5/1208 |

FOREIGN PATENT DOCUMENTS

| | | |
|---|---|---|
| JP | 2009092136 | 4/2009 |
| JP | 2010528233 | 8/2010 |
| JP | 2017082991 | 5/2017 |
| JP | 2017214968 | 12/2017 |
| JP | 2018040405 | 3/2018 |
| WO | 2018047845 | 3/2018 |

OTHER PUBLICATIONS

"Office Action of China Counterpart Application", dated Dec. 29, 2021, with English translation thereof, p. 1-p. 13.
"International Search Report (Form PCT/ISA/210) of PCT/JP2020/005057," dated Apr. 14, 2020, withEnglish translation thereof, pp. 1-4.

* cited by examiner

ANTI-VIBRATION APPARATUS HAVING BRACKET

CROSS-REFERENCE TO RELATED APPLICATIONS

This application is a continuation application of International Application number PCT/JP2020/005057, filed on Feb. 10, 2020, which claims the priority benefit of Japan Patent Application No. 2019-058918, filed on Mar. 26, 2019. The entirety of each of the above-mentioned patent applications is hereby incorporated by reference herein and made a part of this specification.

BACKGROUND

Technical Field

The disclosure relates to an anti-vibration apparatus having a bracket, in which an anti-vibration apparatus body is horizontally mounted to the bracket.

Description of Related Art

Conventionally, an anti-vibration apparatus used in an engine mount, etc., is known. The anti-vibration apparatus includes an anti-vibration apparatus body in which a first mounting member and a second mounting member are connected by a body rubber elastic body. Also, in the anti-vibration apparatus, a bracket is mounted to the second mounting member of the anti-vibration apparatus body, and the second mounting member is mounted to a vehicle body, etc., via the bracket. Japanese Laid-Open No. 2010-528233 (Patent Document 1), for example, discloses an anti-vibration apparatus having a bracket.

In the anti-vibration apparatus having the bracket, the anti-vibration apparatus body is horizontally mounted to the bracket by fitting the fitting portions disposed on the two sides of the width direction of the second mounting member to the fitting grooves provided on the opposite inner surfaces on the two sides of the width direction of the bracket. In such a mounting structure of the anti-vibration apparatus body and the bracket, a mechanism for preventing the anti-vibration apparatus body from being detached from the bracket may be disposed. In Patent Document 1, the fitting portion of the second mounting member rides over the snap fitting protrusion disposed in the fitting groove, so as to prevent the second mounting member from being detached from the bracket.

PRIOR ART DOCUMENT

[Patent Document 1] Japanese Laid-Open 2010-528233

However, the inventor finds that, since the snap fit protrusion of the snap fit structure of Patent Document 1 is in the fitting groove, it is difficult to confirm whether the second mounting member has reliably ridden over the snap fit protrusion to be locked.

In addition, since the snap fit protrusion is formed by gouging the wall part of the fitting groove, the strength of the fitting groove may be low. Moreover, since the protruding direction of the snap fit protrusion is substantially perpendicular to the extending direction of the fitting groove, the mold structure at the time of manufacturing the bracket may be complicated.

The issue to be solved in the disclosure is to provide a novel structure of an anti-vibration apparatus having a bracket. The anti-vibration apparatus is capable of reliably preventing the anti-vibration apparatus body from being detached from the bracket by using a structure that is easy to manufacture.

SUMMARY

According to a first aspect, an anti-vibration apparatus having a bracket and including an anti-vibration body in which a first mounting member and a second mounting member are connected by a body rubber elastic body is provided. In the anti-vibration apparatus where the anti-vibration apparatus body is horizontally mounted to the bracket by fitting parts disposed on two sides of a width direction of the second mounting member in the anti-vibration apparatus body to fitting grooves disposed on opposite inner surfaces on two sides of a width direction of the bracket, a locking hole is provided on a deep wall part located on a deep side in a mounting direction of the second mounting member in the bracket, and a locking part is disposed at a tip portion in the mounting direction of the second mounting member to the bracket, and prevents return in a direction opposite to the mounting direction by inserting and locking the locking part to the locking hole.

According to a second aspect, in the anti-vibration apparatus having the bracket according to the first aspect, a recess open to outside is provided on the deep wall part of the bracket, and the locking hole is formed on a bottom part of the recess.

DESCRIPTION OF THE EMBODIMENTS

Figure 1:
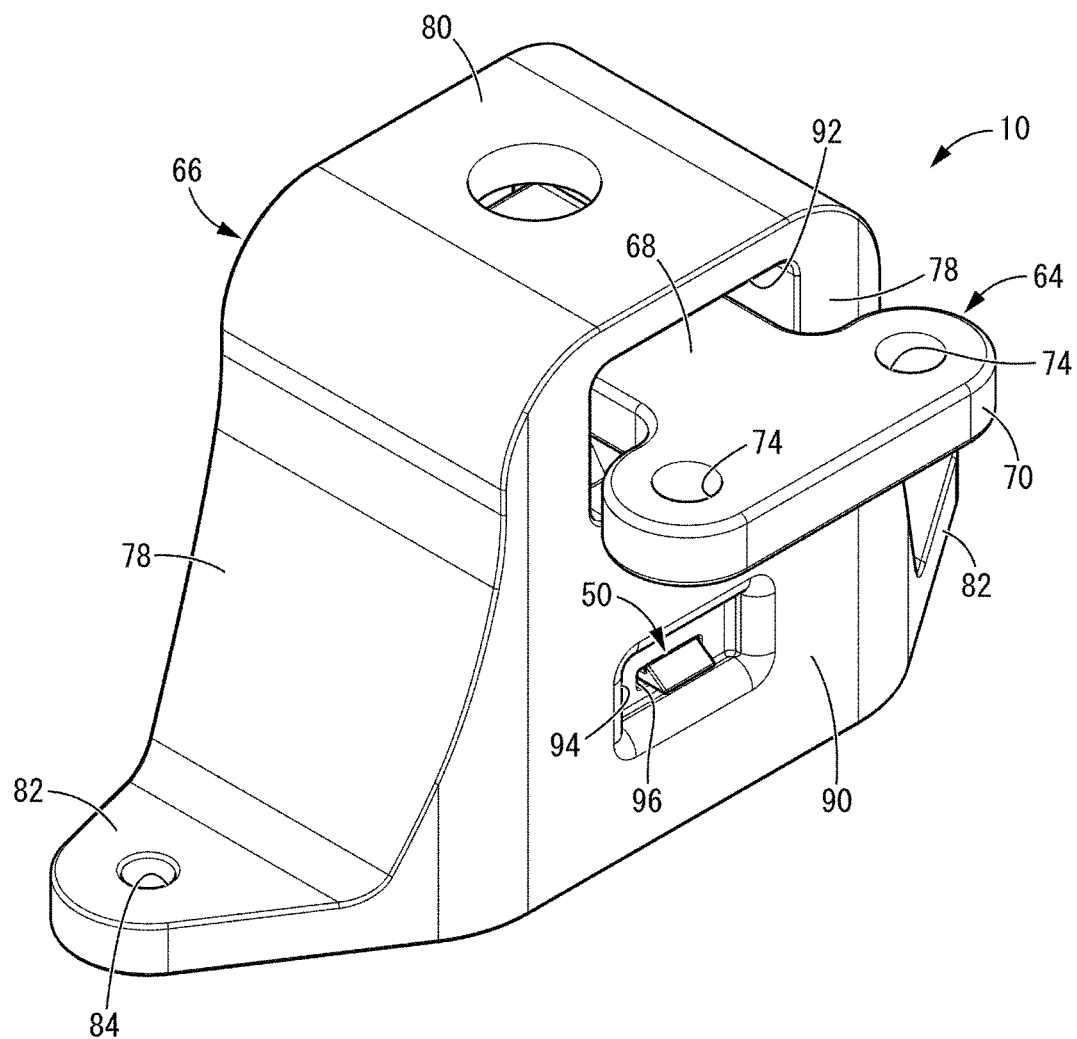
FIG. 1 is a perspective view illustrating an engine mount according to a first embodiment of the disclosure.
Figure 2:
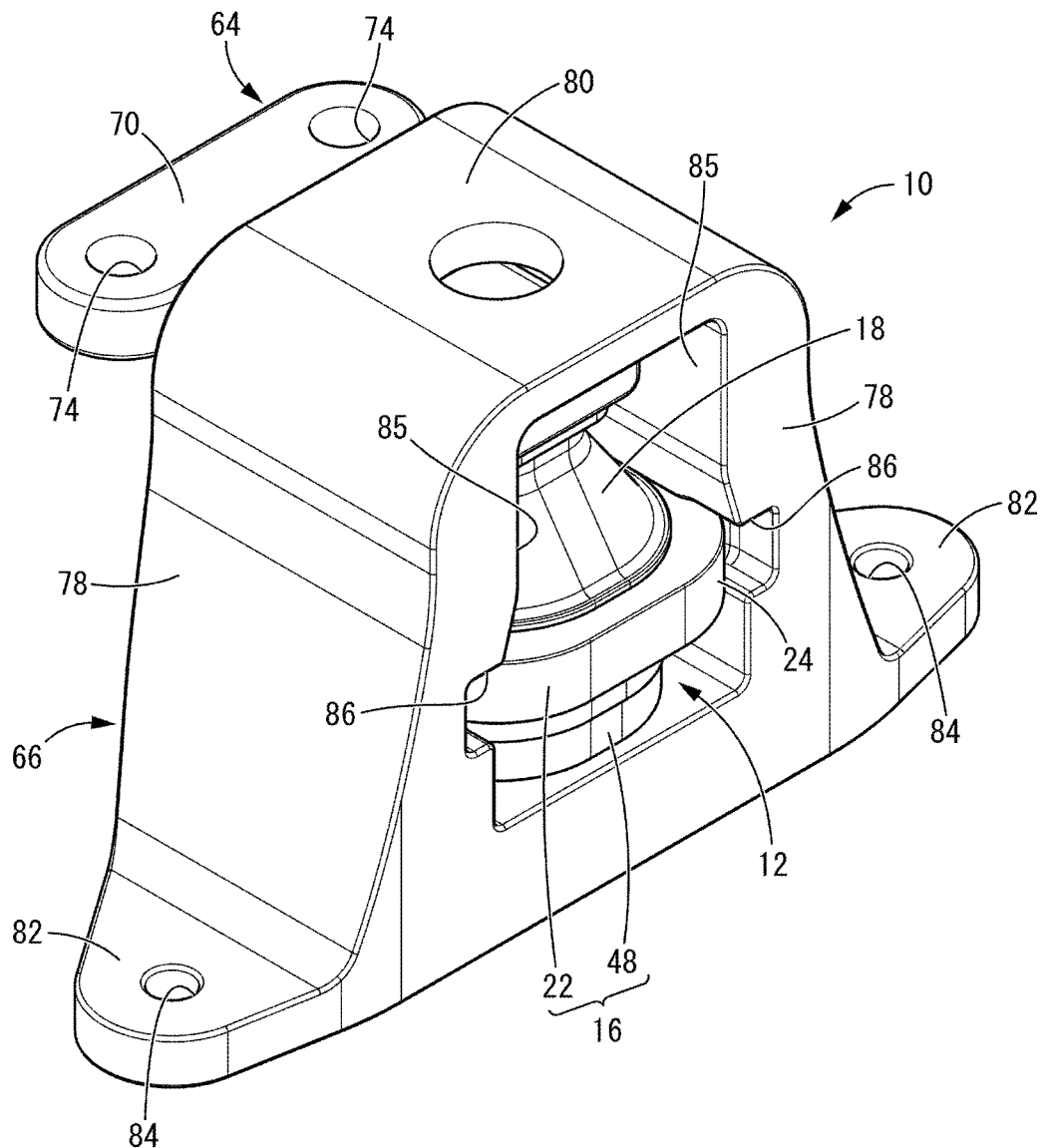
FIG. 2 is a perspective view illustrating the engine mount shown in FIG. 1 from a different angle.

In the following, the exemplary aspects for understanding the disclosure will be described. However, the embodiments described in the following are merely exemplary and, in addition to being used in proper combination with each other, the forming components described in the respective embodiments can, where possible, be independently recognized and adopted, and can be properly combined with any of the forming components described in other embodiments. Accordingly, the disclosure is not limited to the embodiments described in the following, but can be realized by various other aspects.

According to a first aspect, an anti-vibration apparatus having a bracket and including an anti-vibration apparatus body in which a first mounting member and a second mounting member are connected by a body rubber elastic body is provided. In the anti-vibration apparatus where the anti-vibration apparatus body is horizontally mounted to the bracket by fitting parts disposed on two sides of a width direction of the second mounting member in the anti-vibration apparatus body to fitting grooves disposed on opposite inner surfaces on two sides of a width direction of the bracket, a locking hole is provided on a deep wall part located on a deep side in a mounting direction of the second mounting member in the bracket, and a locking part is disposed at a tip portion in the mounting direction of the second mounting member to the bracket, and prevents return in a direction opposite to the mounting direction by inserting and locking the locking part to the locking hole.

According to the anti-vibration apparatus having the bracket and structured according to the aspect, since the locking hole of the bracket is disposed on the deep wall part separated from the fitting groove, the formation of the locking hole can be prevented from influencing the strength of the fitting groove. Therefore, by fitting the fitting part of the second mounting member, the strength in the fitting groove upon which a stress easily acts is ensured, and, by inserting and locking the locking part to the locking hole, the detachment of the second mounting member from the bracket is prevented.

Since the locking hole is provided on the deep wall part located on the deep side of the mounting direction of the second locking member to the bracket, the locking hole is formed on the extending direction of the fitting groove. Therefore, at the time of manufacturing the bracket, the mold for molding the inner surface of the bracket can be easy to insert and remove in the mounting direction and the opposite direction, and the locking hole can be formed with a simple mold structure divided in the mounting direction.

With the locking hole provided to penetrate through the deep wall part, the insertion and locking condition of the locking part with respect to the locking hole can be easily confirmed visually. Therefore, whether the locking part is correctly inserted and locked to the locking hole can be reliably recognized, and the detachment of the anti-vibration apparatus body from the bracket can be reliably avoided by preventing the manufacturing defect such as defective locking.

The locking part of the second locking member is disposed at the tip portion in the mounting direction to the bracket. Accordingly, at the time of mounting the second locking member to the bracket, since the locking part is firstly inserted into and protected by the area surrounded by the bracket, it is difficult to damage the locking part at the time of assembling.

According to a second aspect, in the anti-vibration apparatus having the bracket according to the first aspect, a recess open to outside is provided on the deep wall part of the bracket, and the locking hole is formed on a bottom part of the recess.

According to the anti-vibration apparatus having the bracket and structured according to the aspect, the tip portion of the locking part penetrating through and protruding from the locking hole can be prevented from significantly protruding from the outside of the deep wall part. Specifically, if the depth of the recess is greater than the height of the protrusion of the tip portion of the locking part from the locking hole, the tip portion of the locking part can be accommodated in the recess to not protrude outside. Accordingly, for example, the locking between the locking part and the locking hole can be prevented from being accidentally removed when the tip portion of the protruding locking part is caught on another member. In addition, by making the height of the protrusion of the tip portion of the locking part small, the anti-vibration apparatus having the bracket can be miniaturized.

According to the disclosure, the anti-vibration apparatus having the bracket capable of reliably preventing the anti-vibration apparatus body from being detached from the bracket by using a structure that is easy to manufacture is provided.

In the following, the embodiments of the disclosure will be described with reference to the drawings.

FIGS. 1 to 5 illustrate, as the first embodiment of the anti-vibration apparatus having a bracket according to the disclosure, an engine mount 10 for an automotive. The engine mount 10 includes an engine mount body 12 as an anti-vibration apparatus body. In the following descriptions, in principle, the top-bottom direction is the top-bottom direction in FIG. 3, which is the central axis direction of the mount, the front-rear direction is the direction orthogonal to the paper surface of FIG. 3, and the left-right direction is the left-right direction of FIG. 3.

Figure 6:
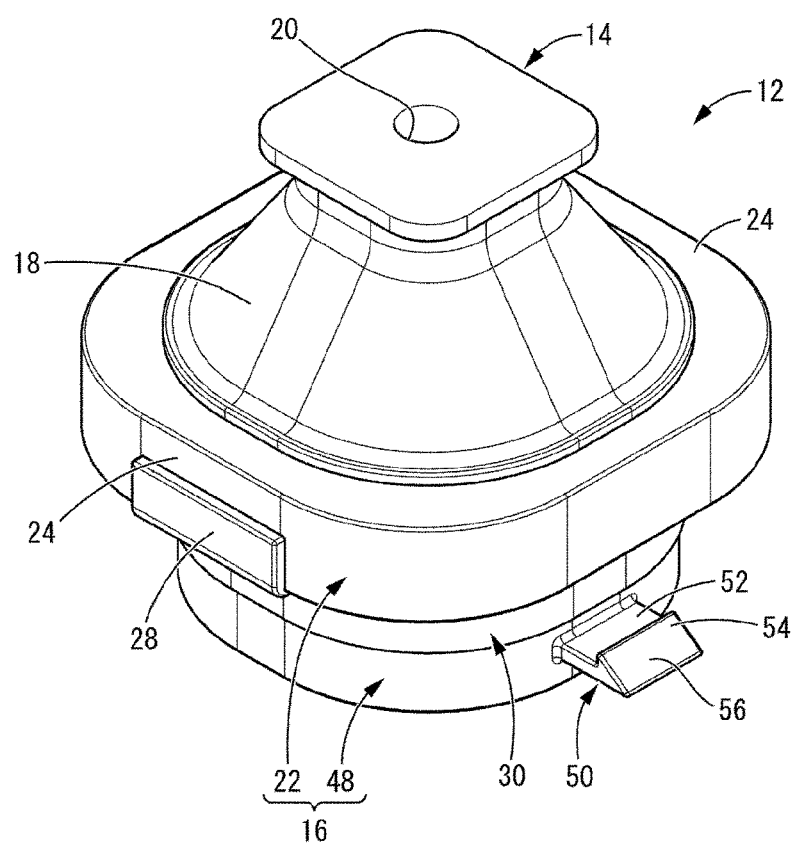
FIG. 6 is a perspective illustrating a mount body forming the engine mount shown in FIG. 1.

More specifically, as shown in FIG. 6, the mount body 12 has a structure in which a first mounting member 14 and a second mounting member 16 are connected by a body rubber elastic body 18.

Figure 4:
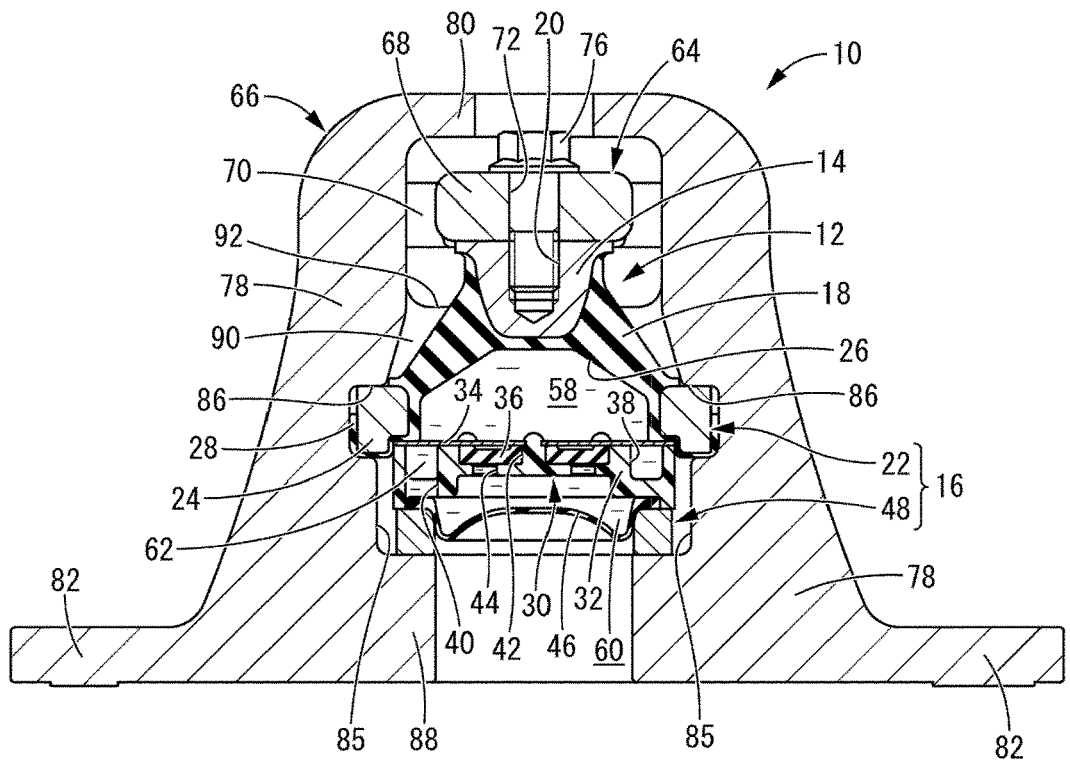
FIG. 4 is a cross-sectional view of the engine mount shown in FIG. 3, and is a cross-sectional view along IV-IV of FIG. 5.
Figure 5:
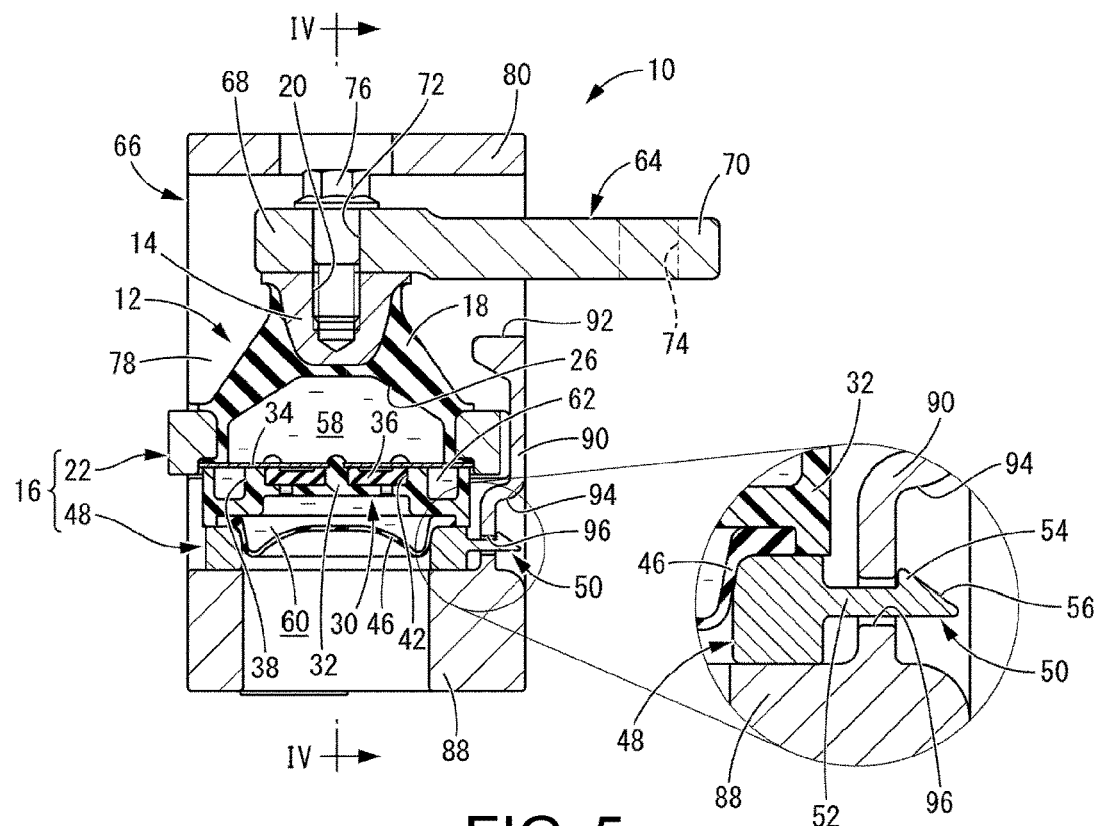
FIG. 5 is a cross-sectional view along V-V of FIG. 3.

The first mounting member 14 is a rigid member formed by metal, synthetic resin, etc., and, as shown in FIGS. 4 and 5, has a solid circular block shape. The first mounting member 14 has a smaller diameter toward the bottom. The first mounting member 14 has a screw hole 20 extending in the top-bottom direction and open on the top surface.

The second mounting member 16 includes a fixing member 22. The fixing member 22, like the first mounting member 14, is a rigid member, and is in a substantially rectangular frame shape. The outer periphery portion of the fixing member 22 is more protrusive downward than the inner periphery portion, and the top-bottom dimension of the outer periphery portion is set larger. With the outer periphery portion of the fixing member 22 having the greater top-bottom dimension on the two sides of the width direction of the second mounting member 16a, which is equivalent to the left-right direction of FIG. 4, a pair of fitting portions 24, 24 fit into fitting grooves 86 of an outer bracket 66 to be described afterwards are configured.

The first mounting member 14 and the fixing member 22 of the second mounting member 16 are disposed to be vertically apart on substantially the same central axis, and the body rubber elastic body 18 is disposed between the first mounting member 14 and the fixing member 22. The main rubber elastic body 18 is in a substantially truncated cone shape, the upper part, as a small diameter side, is fixed to the first mounting member 14, and the fixing member 22 of the second mounting member 16 is fixed to the outer peripheral surface of the lower part as a large diameter side. The body rubber elastic body 18 is vulcanization-bonded to the first mounting member 14 and the fixing member 22 of the second mounting member 16 at the time of molding.

The body rubber elastic body 18 includes a recessed part 26 open downward. The recessed part 26 is in a tapered shape in which the diameter of the top part of the peripheral wall decreases toward the top. The body rubber elastic body 18 has a cross-sectional shape that is taper-like and inclined downward toward the outer periphery by forming the recessed part 26.

As shown in FIGS. 4 and 6, a press-fit rubber 28 integrally formed with the body rubber elastic body 18 is fixed to the lower surface and the lower portion of the outer peripheral surface of the fitting part 24 in the fixing member 22. The press-fit rubber 28 is fixed to the central portion of the front-rear direction of the fixing member 22, and is continuous with the body rubber elastic body 18 on the outer peripheral side of the recessed part 26.

A partition member 33 is mounted to the fixing member 22 that forms the second mounting member 16. The partition member 30 as a whole has a substantially circular plate shape, and has a structure in which a movable member 36 is disposed between a partition member body 32 and a cover member 34.

The partition member body 32 is formed with a peripheral groove 38 in which the outer peripheral portion extends in a circumferential direction in a length less than one round, and which is formed to be open on the top surface. A lower communication hole 40 that penetrates through the lower wall part of the peripheral groove 38 is formed on one end part of the peripheral groove 38. An annular accommodating recess 42 is formed to be open on the top surface on the inner peripheral portion of the partition member body 32. A plurality of lower through holes 44 are formed through the lower wall part of the accommodating recess 42.

The cover member 34 is in a thin circular plate shape, and is overlapped with the top surface of the partition member body 32 to be fixed. An upper communication hole not shown in the portion covering the other end part of the peripheral groove 38 is formed on the cover member 34. A plurality of upper through holes not shown in the portion covering the accommodating recess 42 is formed on the cover member 34.

The movable member 36 is accommodated in the accommodating recess 42 of the partition member body 32. The movable member 36 is a rubber elastic body in a substantially annular plate shape, and the inner peripheral end part and the outer peripheral end part are respectively protrusive toward the top side and are thickened. Then, in the state in which the movable member 36 is inserted into the accommodating recess 42, by fixing the cover member 34 to the partition member body 32, the movable member 36 is accommodated in the accommodating recess 42 between the partition member body 32 and the cover member 34. In the movable member 36, the inner peripheral end part and the outer peripheral end part, which are thickened, are held between the partition member 32 and the cover member 34 in the top-bottom direction, and the movable member 36 allows elastic deformation in the thickness direction between the inner peripheral end part and the outer peripheral end part.

A flexible film 46 formed as a thin elastomer is disposed below the partition member 30. The flexible film 46 has a thickened outer peripheral end part, and is overlapped with the lower surface of the partition member body 32. Then, a frame-shaped support member 48 is overlapped from below with respect to the outer peripheral end part of the flexible film 46, and in a state in which the mount body 12 is mounted to the outer bracket 66, which will be described afterwards, the outer peripheral end part of the flexible film 46 is held between the partition member body 32 and the support member 48.

The support member 48 is a member that forms the second mounting member 16 in the embodiment, and is a rigid member like the fixing member 22. In the state in which the mount body 12 is mounted to the outer bracket 66, which will be described afterwards, the inner peripheral portion of the support member 48 holds the flexible film 46, and the outer peripheral portion of the support member 48 abuts against the lower surface of the partition member 32. Accordingly, the support member 48 is positioned with respect to the fixing member 22 via the partition member body 32, and the second mounting member 16 of the embodiment is formed by the fixing member 22 and the support member 48.

A locking part 50 is disposed in front of the support member 48. As shown in FIGS. 5 and 6, the locking part 50 has a structure in which a plate-shaped insertion part 52 extending from the front surface of the support member 48 and a locking protrusion 54 protruding toward the top from the insertion part 52 are integrally formed. The side surface on the rear of the locking protrusion 54 extends substantially orthogonal to the front-rear direction. The front end surface of the locking part 50 is arranged as an inclined surface 56 inclined downward toward the front. Accordingly, the protruding tip portion of the locking part 50 gradually becomes thinner in the top-bottom direction toward the front side that is the protruding tip side.

By mounting the partition member 30 and the flexible film 46 with respect to the second mounting member 16 that forms the integrally vulcanized molded article of the body rubber elastic body 18, a pressure-receiving chamber 58 in which a portion of the wall part is formed by the body rubber elastic body 18 is formed between the body rubber elastic body 18 and the partition member 30. Moreover, an equilibrium chamber 60 in which a portion of the wall part is formed by the flexible film 46 is formed between the partition member 30 and the flexible film 46. A non-compressive fluid is sealed in the pressure-receiving chamber 58 and the equilibrium chamber 60. While the non-compressive fluid is not particularly limited, water, ethylene glycol, etc., may be adopted. The non-compressive fluid may also be a liquid mixture.

The pressure-receiving chamber 58 and the equilibrium chamber 60 are in communication with each other by an orifice passage 62 including the peripheral groove 38. The orifice passage 62 extends in the circumferential direction of the outer peripheral portion of the partition member 30, and the two end parts are respectively connected to the pressure-receiving chamber 58 and the equilibrium chamber 60. Then, when the vibration in the top-bottom direction is input between the first mounting member 14 and the second mounting member 16 to generate an internal pressure difference between the pressure-receiving chamber 58 and the equilibrium chamber 60, a fluid flow occurs through the orifice passage 62 between the pressure-receiving chamber 58 and the equilibrium chamber 60, so that an anti-vibration effect, such as a high damping effect, based on the fluid flow is exhibited. In the orifice passage 62, the tuning frequency, which is the resonance frequency of the flowing fluid, is adjusted to the vibration frequency of the anti-vibration target by a ratio between the passage cross section and the passage length, such as being set to a low frequency of about 10 Hz that corresponds to engine shake.

The hydraulic pressures of the pressure-receiving chamber 58 and the equilibrium chamber 60 are respectively exerted on the upper and lower surfaces of the movable member 36 arranged in the accommodating recess 42. Then, when the vibration in the top-bottom direction is input between the first mounting member 14 and the second mounting member 16 to generate an internal pressure difference between the pressure-receiving chamber 58 and the equilibrium chamber 60, the movable member 36 is elastically deformed in the thickness direction, so as to transmit the hydraulic pressure to the pressure-receiving chamber 58 and release the hydraulic pressure.

In the case where a low-frequency high-amplitude vibration is input, the fluid flow passing through the orifice passage 62 is actively generated in a resonance state, and an anti-vibration effect due to high damping is exhibited. In the case where a low-frequency high-amplitude vibration is input, since the deformation of the movable member 36 cannot follow, the effect of releasing the hydraulic pressure through the deformation of the movable member 36 is not exhibited. Therefore, the fluid flow through the orifice passage 62 is generated efficiently. In the case where a middle to high-frequency low-amplitude vibration is input, due to anti-resonance, the orifice passage 62 becomes substantially clogged. In the case where a middle to high-frequency low-amplitude vibration is input, the movable member 36 is actively deformed elastically in the resonance state to release the hydraulic pressure, and an anti-vibration effect due to a low dynamic spring constant is exhibited.

An inner bracket 64 and, as a bracket, an outer bracket 66 are mounted to the mount body 12.

The inner bracket 64 is a plate-like member, and includes a connection part 68 overlapped with the top surface of the first mounting member 14 to extend toward the front (the right side in FIG. 5) and a mounting member 70 integrally formed on the front of the connection part 68. The connection part 68 includes a bolt hole 72 penetrating in the top-bottom direction in the portion overlapped with the top surface of the first mounting member 14. The mounting part 70 protrudes toward the left and right sides with respect to the connection part 68 and includes bolt holes 74 penetrating in the top-bottom direction. In addition, by screw-connecting a connection bolt 76 inserted through the bolt hole 72 of the connection part 68 to the screw hole 20 of the first mounting member 14, the inner bracket 64 is fixed to the first mounting member 14 to be mounted to the mount body 12.

The outer bracket 66 includes a part of leg parts 78, 78. The pair of leg parts 78, 78 respectively extend in the top-bottom direction, and are disposed to be opposite to each other in the left-right direction. The upper end parts of the pair of leg parts 78, 78 are connected with each other by an integrally formed top wall part 80. On the lower end parts of the pair of leg parts 78, 78, mounting pieces 82 protruding outward in the left-right direction are respectively disposed. Each of the mounting pieces 82 is formed with a bolt hole 84 penetrating in the top-bottom direction (see FIGS. 1, 2).

The pair of leg parts 78 have opposite inner surfaces 85, 85 opposite in the left-right direction of FIG. 4, which is the width direction of the outer bracket 66, and include the fitting grooves 86, 86 open on the opposite inner surfaces 85, 85 in the left-right direction. The fitting grooves 86, 86 provided on the two sides of the width direction of the outer bracket 66 extend linearly in the front-rear direction. One end part reaches the rear end of the pair of leg parts 78, 78 and is open on the rear surface, and the other end part does not reach the front end of the pair of leg parts 78, 78.

On the side of the pair of leg parts 78, 78 lower than the fitting grooves 86, 86, a holding part 88 protruding toward the inner sides of the opposite directions of the pair of leg parts 78, 78 are disposed. The left and right side portions of the holding part 88 are connected in the left-right direction at the two ends in the front-rear direction, and the holding part 88 is in a tubular shape as a whole.

Figure 3:
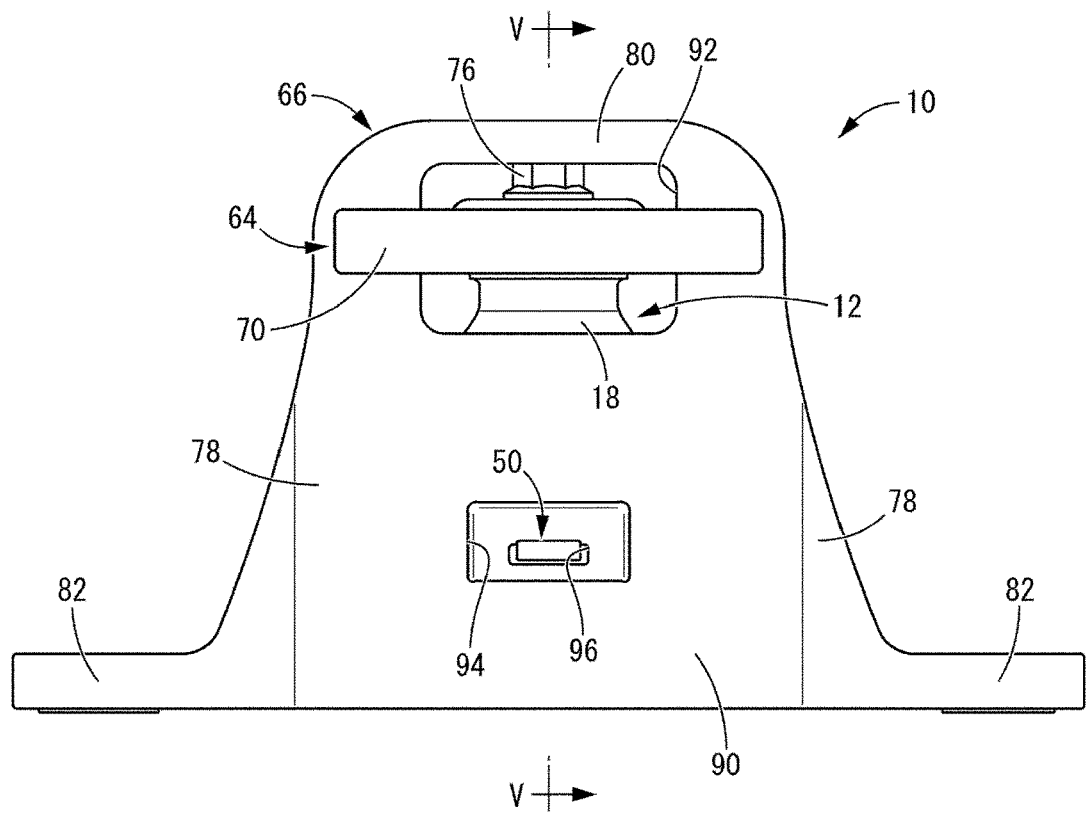
FIG. 3 is a front view of the engine mount shown in FIG. 1.

A deep wall part 90 is disposed at the front end portions of the pair of leg parts 78, 78. The deep wall part 90 is arranged to be plate-like and extends in a direction intersecting the front-rear direction, and the left and right end parts are connected with the pair of leg parts 78, 78. The upper end part of the deep wall part 90 is separated from the top wall part 80 toward the lower side, and an insertion hole 92 penetrating in the front-rear direction is formed between the deep wall part 90 and the top wall part 80. A recess 94 is formed on the deep wall part 90. As shown in FIGS. 1 and 3, the recess 94 is formed at the central portion of the left-right direction of the deep wall part 90. The recess 94 is open on the front surface of the deep wall part 90, which is outside with respect to the space in which the mount body 12 is disposed. The front-rear depth dimension of the recess 94 is greater than the front-rear dimension of the locking protrusion 54 of the locking part 50 from the rear surface to the tip side in the mount body 12.

As shown in FIG. 5, a locking hole 96 is formed on the bottom part of the recess 94 in the deep wall part 90. The locking hole 96 penetrates through the deep wall part 90 in the front-rear direction at the portion in which the recess 94 is formed. The locking hole 96 has a hole cross-sectional shape substantially corresponding to the shape of the projection of the locking part 50 of the mount body 12 in the front-rear direction.

The mount body 12 is mounted to the outer bracket 66. That is, the mount body 12 is inserted from the rear toward the front, which is the mounting direction, with respect to the space surrounded by the pair of leg parts 78, 78, the top wall part 80, and the holding part 88 of the outer bracket 66. At this time, as shown in FIG. 4, the fitting parts 24, 24 on the left and right sides of the fixing member 22 of the second mounting member 16 of the mount body 12 are fit into the fitting grooves 86, 86 of the pair of leg parts 78, 78. In addition, in the second mounting member 16 of the mount body 12, the lower surface of the support member 48 is overlapped with the top surface of the holding part 88 of the outer bracket 66. Accordingly, the second mounting member 16 is fixed to the outer bracket 66, and the mount body 12 is mounted to the outer bracket 66 in a horizontal direction substantially orthogonal to the top-bottom direction.

The press-fit rubbers 28 are respectively fixed to the fitting parts 24, 24 of the second mounting member 16. The left and right outer surfaces and the lower surfaces of the fitting parts 24, 24 are fit into the fitting grooves 86, 86 via the press-fit rubbers 28, 28. Accordingly, the defective fitting due to dimension errors of the fitting parts 24, 24 and the fitting grooves 86, 86 is avoided, and the variation of the force required for fitting is reduced.

Forces in the directions approaching each other in the top-bottom direction act on the fixing member 22 fit to the fitting grooves 86, 86 and the support member 48 overlapped with the top surface of the holding part 88. Accordingly, the lower end part of the body rubber elastic body 18 between the fixing member 22 and the partition member 30 is compressed in the top-bottom direction, and the outer peripheral end part of the flexible film 46 between the partition member 30 and the support member 48 is compressed in the top-bottom direction. Accordingly, the fluid tightness in the wall parts of the pressure-receiving chamber 58 and the equilibrium chamber 60 is high, and defects such as fluid leakage are avoided.

As shown in FIG. 5, by mounting the mount body 12 to the outer bracket 66, the locking part 50 disposed on the support member 48 of the mount body 12 is inserted into the locking hole 96 formed on the deep wall part 90 of the outer bracket 66. That is, the locking part 50 disposed, in the mount body 12, at the tip portion in the mounting direction to the outer bracket 66 is elastically bent while being inserted into the locking hole 96 by pressing the inclined surface 56 against the opening edge part of the locking hole 96. When the locking protrusion 54 of the locking part 50 moves forward over the locking hole 96, the pressing between the inner wall surface of the locking hole 96 and the locking protrusion 54 is removed, the locking part 50 is restored to the initial form, and the locking part 50 is in a state in which the insertion part 52 is inserted into the locking hole 96.

The locking part 50 is disposed, in the mount body 12, at the tip portion in the mounting direction to the outer bracket 66. Therefore, at the time of mounting the mount body 12 to the outer bracket 66, the locking part 50 is first inserted into the region surrounded by the pair of leg parts 78, 78, the top wall part 80, and the holding part 88 of the outer bracket 66. As a result, in the operation of mounting the mount body 12 to the outer bracket 66, the locking part 50 is protected by the outer bracket 66, and the damage to the locking part 50 is easily avoided.

The direction in which the fitting parts 24, 24 are guided by the fitting grooves 86, 86 and the direction in which the locking part 50 is inserted into the locking hole 96 are respectively the same direction. Therefore, by fitting the fitting parts 24, 24 into the fitting grooves 86, 86, the locking part 50 is easily inserted and locked to the locking hole 96.

The locking part 50 inserted into the locking hole 96 and restored to the initial form is in a state in which the upper end part of the locking protrusion 54 protrudes over the opening of the locking hole 96 on the top side. Accordingly, when the mount body 12 is moved rearward in a detaching direction opposite to the mounting direction with respect to the outer bracket 66, the locking protrusion 54 of the locking part 50 is locked by the opening edge part of the locking hole 96, and the mount body 12 is prevented from returning rearward with respect to the outer bracket 66. Accordingly, by inserting and locking the locking part 50 of the mount 12 to the locking hole 96 of the outer bracket 66, a stop mechanism that prevents the mount body 12 from being detached from the outer bracket 66 is formed.

The stop mechanism that prevents the mount body 12 from being separated from the outer bracket 66 is provided independently from the mounting structure of the mount body 12 and the outer bracket 66 in which the fitting parts 24, 24 of the mount body 12 are fit to the fitting grooves 86, 86 of the outer bracket 66. Therefore, the mounting strength between the mount body 12 and the outer bracket 66 with the fitting between the fitting parts 24, 24 and the fitting grooves 86, 86 can be sufficiently ensured, while the detachment of the mount body 12 from the outer bracket 66 can be prevented.

In the front-rear direction including the mounting direction of the mount body 12 to the outer bracket 66, the locking hole 96 is disposed to linearly penetrate through the deep wall part 90. Therefore, at the time when the outer bracket 66 is formed by die-casting, by forming the deep wall part 90 by using a mold serving for molding and divided into front and rear, the locking hole 96 can be easily formed. Besides, since the fitting grooves 86, 86 also extend in the front-rear direction, by molding the opposite inner surfaces 85, 85 of the pair of leg parts 78, 78 by using the mold serving for molding and divided into front and rear, the fitting grooves 86, 86 as well as the locking hole 96 can be easily formed.

Regarding the locking part 50 inserted into the locking hole 96, since the tip portion protrudes forward from the deep wall part 90 and is exposed, whether the locking part 50 is locked with respect to the locking hole 96 in a correct state can be easily confirmed visually.

In the engine mount 10 in which the inner bracket 64 and the outer bracket 66 are mounted to the mount body 12, for example, the inner bracket 64 is mounted to a power unit (not shown) by bolts (not shown) inserted into the bolt holes 74, 74 of the mounting part 70. The inner bracket 64 passes through the insertion hole 92 of the outer bracket 66 to protrude forward over the deep wall part 90 of the outer bracket 66. In addition, in the engine mount 10, for example, the outer bracket 66 is mounted to a vehicle body (not shown) by bolts (not shown) inserted into the bolt holes 84, 84 of the mounting pieces 82, 82. Accordingly, the power unit is in anti-vibration connection with respect to the vehicle body via the engine mount 10.

Although the embodiment of the disclosure has been described in detail above, the disclosure is not limited to the specific descriptions thereof. For example, while the second mounting member 16 of the embodiment is divided into the fixing member 22 and the support member 48, a second mounting member having, as a whole, a single component may also be adopted.

Regarding the locking part, it suffices as long as the locking part is disposed on the second mounting member. For example, in the embodiment, the locking part 50 may also be disposed in the fixing member 22 forming the second mounting member 16. The locking part is not particularly limited to a specific shape as long as the locking part can be inserted and locked to the locking hole. For example, a structure where the locking part is bent to be inserted into the locking hole by disposing the locking protrusions to protrude on the upper and lower sides, forming slits that extend in a direction orthogonal to the top-bottom direction in the upper and lower intermediate portions of the forming portions of the locking protrusions, and reducing the top-down widths of the slits may also be adopted.

A plurality of sets of the locking part and the locking hole can be disposed. Accordingly, at the time when the anti-vibration apparatus body is about to displace in the detachment direction from the bracket, the load acting on the respective insertion locking portions of the locking parts and the locking holes is dispersed, and the durability is increased. Moreover, in addition to the locking mechanism by insertion and locking of the locking part to the locking hole, another locking mechanism can also be adopted. Specifically, for example, as disclosed in Japanese Laid-Open No. 2017-214968, a locking mechanism may also be disposed by disposing a lock protruding part in the fitting groove of the outer bracket and locking the lock protrusion part with the fitting part of the second mounting member.

The recess 94 accommodating the tip portion of the locking part 50 is not required. In addition, in the case where the recess 94 is disposed, the depth dimension of the recess 94 may also be smaller than the length dimension of the tip portion of the locking part 50. In such case, by reducing the length of the portion of the locking part 50 protruding from the recess 94, it is difficult for other components nearby to interfere with the locking part 50.

The disclosure is not particularly limited to the structure which completes the sealing of the pressure-receiving chamber and the equilibrium chamber by assembling the anti-vibration apparatus body to the bracket, the sealing may also be completed under the single state of the anti-vibration apparatus body before the anti-vibration apparatus body is mounted to the bracket. In addition, the anti-vibration apparatus body is not limited to the liquid sealing structure. A solid-type anti-vibration apparatus body without the liquid sealing structure such as the pressure-receiving chamber and the equilibrium chamber can also be adopted.

What is claimed is:

1. An anti-vibration apparatus having a bracket, comprising an anti-vibration apparatus body in which a first mounting member and a second mounting member are connected by a body rubber elastic body, wherein in the anti-vibration apparatus having the bracket where the anti-vibration apparatus body is horizontally mounted to the bracket by fitting parts disposed on two sides of a width direction of the second mounting member in the anti-vibration apparatus body to fitting grooves disposed on opposite inner surfaces on two sides of a width direction of the bracket, a locking hole is provided on a deep wall part located on a deep side in a mounting direction of the second mounting member in the bracket, and a locking part is disposed at a tip portion in the mounting direction of the second mounting member to the bracket, and prevents return in a direction opposite to the mounting direction by inserting and locking the locking part to the locking hole, wherein the locking part comprises an inclined surface inclined away from the deep wall part, and the inclined surface is disposed outside the locking hole in a state where the locking part is inserted into the locking hole.

2. The anti-vibration apparatus having the bracket as claimed in claim 1, wherein a recess open to outside is provided on the deep wall part of the bracket, and the locking hole is formed on a bottom part of the recess.

\* \* \* \* \*